(12) United States Patent
Leigh (10) Patent No.: US 7,401,340 B2
(45) Date of Patent: Jul. 15, 2008

(54) SUPPORTING CROSS-COMPONENT REFERENCES IN AN OBJECT-ORIENTED PROGRAMMING SYSTEM

(75) Inventor: John W. Leigh, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 530 days.

(21) Appl. No.: 10/970,454

(22) Filed: Oct. 21, 2004

(65) Prior Publication Data

US 2006/0090170 A1 Apr. 27, 2006

(51) Int. Cl.
*G06F 3/00* (2006.01)
*G06F 7/20* (2006.01)
*G06F 9/44* (2006.01)

(52) U.S. Cl. .............. 719/332; 717/165; 707/103 Z
(58) Field of Classification Search .......... 719/331, 719/332; 717/165; 707/103 Z
See application file for complete search history.

(56) References Cited

U.S. PATENT DOCUMENTS

| | | | | |
|---|---|---|---|---|
| 5,819,091 A | * | 10/1998 | Arendt et al. | 719/331 |
| 5,842,018 A | * | 11/1998 | Atkinson et al. | 715/501.1 |
| 6,012,085 A | * | 1/2000 | Yohe et al. | 709/217 |
| 6,016,478 A | * | 1/2000 | Zhang et al. | 705/9 |
| 6,105,072 A | * | 8/2000 | Fischer | 719/315 |
| 6,185,733 B1 | * | 2/2001 | Breslau et al. | 717/163 |
| 6,253,257 B1 | * | 6/2001 | Dundon | 719/331 |
| 6,571,388 B1 | * | 5/2003 | Venkatraman et al. | 717/166 |
| 2004/0003007 A1 | * | 1/2004 | Prall et al. | 707/200 |
| 2005/0050084 A1 | * | 3/2005 | Atm | 707/102 |
| 2005/0066303 A1 | * | 3/2005 | Rochette et al. | 717/100 |

OTHER PUBLICATIONS

De Sutter, Bjorn; De Bus, Bruno; and De Bosschere, Koen. "Sifting Out The Mud: Low Level C++ Code Reuse." Conference on Object Oriented Programming Systems and Applications; Proceedings of the 17th ACM SIGPLAN Conference on Object-Oriented Programming, Systems, and Applications, 2002.*

Duggan, Dominic. "Type-Safe Linking With Recursive DLLs and Shared Libraries." ACM Transactions on Programming Languages and Systems: vol. 24, Issue 6, Nov. 2002.*

(Continued)

*Primary Examiner*—Li B. Zhen
*Assistant Examiner*—Richard Pantoliano, Jr.
(74) *Attorney, Agent, or Firm*—Park, Vaughan & Fleming LLP (57) ABSTRACT

One embodiment of the present invention provides a system that supports cross-component references in an object-oriented programming system. During operation, the system makes a first attempt to obtain a name for a referenced object through a cross-component reference between a referencing object and the referenced object. This first attempt involves attempting to obtain the name for the referenced object from the referenced object, which involves attempting access the referenced object through an identifier for the referenced object within the cross-component reference. If this first attempt fails, the system makes a second attempt to obtain the name for the referenced object, which involves obtaining a pathname for the referenced object from the cross-component reference.

18 Claims, 6 Drawing Sheets

OTHER PUBLICATIONS

Fong, Philip W. L. and Cameron, Robert D. . "Proof Linking: An Architecture for Modular Verification of Dynamically-Linked Mobile Code." Prceedings of the 6th ACM SIGSOFT Internation Symposium on Foundations of Software Engineering, 1998.*

Fong, Philip W. L. and Cameron, Ronbert D.. "Proof Linking: Modular Verification of Mobile Programs in the Presense of Lazy, Dynamic Linking." ACM Transactions on Software Engineering and Methodology: vol. 9, Issue 4, Oct. 2000.*

Janson, Philippe A.. "Dynamic Linking and Environment Initialization in a Multi-Domain Process." Proceedings of the 5th ACM Symposium on Operating Systems Principles, 1975.*

Kessler, Kempf J.. "Cross-Address Space Dynamic Linking." Proceedings of the Second Inernational Workshop on Object Orientation in Operating Systems, 1992.*

Levine, John R.. Linkers and Loaders. San Diego: Academic Press, 2000.*

* cited by examiner

| CROSS-COMPONENT REFERENCE 300 | |
|---|---|
| ID | 302 |
| PATH NAME | 304 |
| AGG_SIG (REFERENCE OBJECT) | 306 |
| AGG_SIG (REFERENCE OBJECT) | 308 |

FIG. 3A

| CROSS-COMPONENT REFERENCE 310 | |
|---|---|
| ID | 312 |
| PATH NAME | 314 |
| TIME STAMP (REFERENCE OBJECT) | 316 |
| TIME STAMP (REFERENCE OBJECT) | 318 |

SUPPORTING CROSS-COMPONENT REFERENCES IN AN OBJECT-ORIENTED PROGRAMMING SYSTEM

BACKGROUND

1. Field of the Invention

The present invention relates to systems that facilitate manipulating objects within an object-oriented programming system. More specifically, the present invention provides a method and an apparatus for supporting cross-component references within an object-oriented programming system.

2. Related Art

Object-oriented programming systems enable programmers to create, modify and manipulate objects, which contain both code and data. These objects are often organized into related groups, which are referred to as "components".

To facilitate the use of components, object-oriented programming systems often provide mechanisms to ensure that objects within components remain consistent with each other as they are updated.

Additionally, many object-oriented programming systems support "loose coupling", which enables programmers to concurrently modify related components. Moreover, loose coupling allows applications to be developed by larger development teams. However, loose coupling also makes it harder to manage consistency between components.

For example, a problem can arise when a referenced object is deleted and re-imported. Suppose there exists a database table (component) called "EMP", with columns "ID" and "DEPT_ID". Also suppose that the column EMP.DEPT_ID contains a foreign-key which refers to the column "ID" in another database table (component) "DEPT". Furthermore, suppose that the column ID is the unique-key for database table (component) DEPT. Note that if DEPT is deleted, its unique-key will also be deleted. However, because of loose coupling, the foreign-key contained in column EMP.DEPT_ID may not be updated to reflect this deletion. Moreover, if DEPT is subsequently re-imported, the foreign-key may still not be updated. Consequently, even after re-importing DEPT, the foreign-key contained in column EMP.DEPT_ID may continue to refer to a non-existent object.

Upon subsequent validation of the EMP object, the database may report an error because the foreign-key in column EMP.DEPT_ID does not refer to a valid unique-key. Consequently, the user may have to either delete the foreign key or change it to refer a new unique-key.

Similarly, problems can arise when a component is updated. For example, an update can cause information within a referencing component to be inconsistent with associated information in a referenced component.

Unfortunately, existing loosely coupled systems do not check for such inconsistencies, which can cause the system to fail. As a result, such inconsistencies are typically detected when it is too late, e.g., after a system failure.

Hence, what is needed is a method and an apparatus for managing consistency between components thereby avoiding the problems described above.

SUMMARY

One embodiment of the present invention provides a system that supports cross-component references in an object-oriented programming system. During operation, the system makes a first attempt to obtain a name for a referenced object through a cross-component reference between a referencing object and the referenced object. This first attempt involves attempting to obtain the name for the referenced object from the referenced object, which involves attempting access the referenced object through an identifier for the referenced object within the cross-component reference. If this first attempt fails, the system makes a second attempt to obtain the name for the referenced object, which involves obtaining a pathname for the referenced object from the cross-component reference.

In a variation on this embodiment, the second attempt also involves obtaining the name for the referenced object from the pathname for the referenced object.

In a variation on this embodiment, while importing an object into a repository, the system first determines if the referenced objects are to be imported along with the object. If so, the system ensures that cross-component references between the object and the referenced objects include both identifiers for the referenced objects and pathnames for the referenced objects. Otherwise, the system ensures that cross-component references between the object and the referenced objects include pathnames for the referenced objects.

In a variation on this embodiment, the system maintains a first aggregate signature within the cross-component reference, which reflects the structure of the referenced object. The system also maintains a second aggregate signature within the cross-component reference, which reflects the structure of the referencing object. The system uses the first aggregate signature and the second aggregate signature to determine whether or not the referenced object is synchronized with the referencing object.

In a variation on this embodiment, the system maintains a first time stamp, within the cross-component reference, indicating the time of the last inbound synchronization from the referenced object to the referencing object. The system also maintains a second time stamp, within the cross-component reference, indicating the time of the last outbound synchronization from the referencing object to the referenced object. The system uses the first time stamp and the second time stamp to determine whether or not the referenced object is synchronized with the referencing object.

In a variation on this embodiment, if the referenced object is not synchronized with the referencing object, the system performs an inbound or an outbound synchronization operation between the referenced object and the referencing object.

In a variation on this embodiment, the system subsequently uses the name obtained for the referenced object while generating code that manipulates the referenced object.

In a variation on this embodiment, the system uses the cross-component reference to access the referenced object from the referencing object.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DYDs (digital versatile discs or digital video discs), and does not include computer instruction signals embodied in a transmission medium (with or without a carrier wave upon which the signals are modulated).

Components within a Programming System

Figure 1:
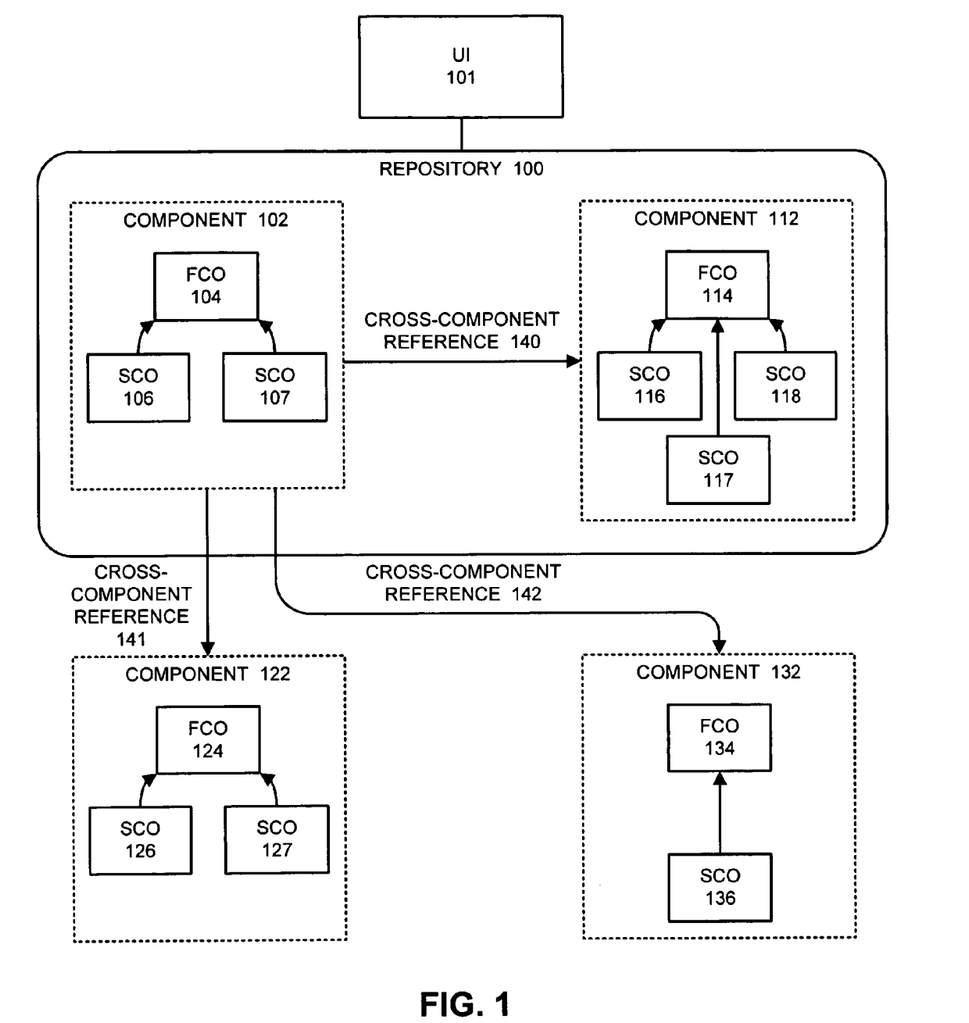
FIG. 1 illustrates components associated with a programming system in accordance with an embodiment of the present invention.

FIG. 1 illustrates components associated with a programming system in accordance with an embodiment of the present invention. More specifically, FIG. 1 illustrates components 102 and 112 (within repository 100) and components 122 and 132 (outside of repository 100). Note that components are managed within repository 100 through a programming environment, which allows users to: manipulate components within repository 100; import components into repository 100; and to export components from repository 100. The programming environment allows users to manipulate these components through a user interface (UI) 101.

In one embodiment of the present invention, objects are classified into folders, first class objects (FCOs) and second class objects (SCOs). A folder is a special FCO which acts as a container for other FCOs. FCOs act as containers for second class objects (SCO). An FCO together with its associated SCOs is referred to as a "component". For example, an FCO can be a database table, and corresponding SCOs can be columns and constraints for the database table. In another example, an FCO can be a mapping that specifies a transformation associated with one or more database tables, and corresponding SCOs can be operators involved in the transformation.

Referring to FIG. 1, component 102 includes FCO 104 and SCOs 106-107; component 112 includes FCO 114 and SCOs 116-118; component 122 includes FCO 124 and SCOs 126-127; and component 132 includes FCO 134 and SCO 136.

An association between objects can be within a component (an intra-association) or across components (an inter-association). Inter-component associations can be between FCO-FCO, FCO-SCO, and SCO-SCO objects, which exist in different components. The term "cross-component reference" (CCR) refers to inter-component association, and the terms "referencing object" and "referenced object" refer to objects at the ends of the cross-component reference. One embodiment of the present invention guarantees the consistency of intra-associations but not inter-associations.

Referring to FIG. 1, component 102 has a cross-component reference 140 to component 112 located within repository 100. Component 102 also has a cross-component reference 141 to component 122 and a cross-component reference 142 to component 132 which are both located outside of repository 100.

In one embodiment of the present invention, the programming system supports a decoupling paradigm, which allows only one user to modify a given component at a time. Within this system, changes in a given component are not transparent to its inter-associations with other components. This lack of transparency can give rise to a number of problems, which are described in more detail below with reference to FIGS. 2-7.

Exemplary Foreign-Key Constraint

Figure 2:
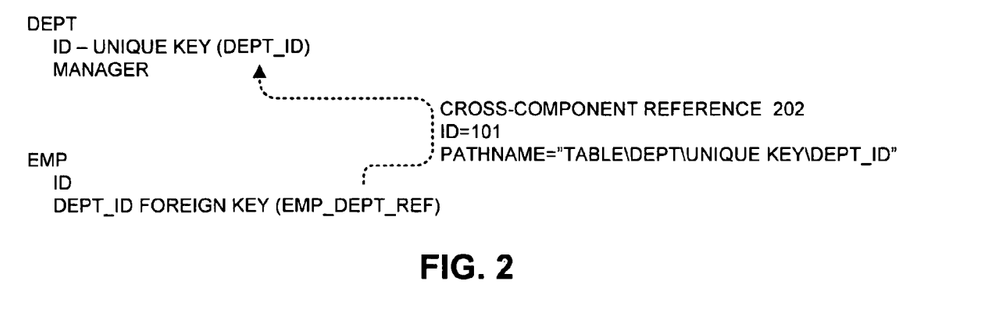
FIG. 2 presents an example of a foreign-key constraint in accordance with an embodiment of the present invention.

FIG. 2 presents an example of a foreign-key constraint in accordance with an embodiment of the present invention. In this example, a component comprising a table EMP contains an ID column and a DEPT-ID column. The DEPT-ID column has a foreign key which refers to a unique key in column ID of the table DEPT. (Note that the table DEPT is another component.)

In this example, the system provides a cross-component reference (CCR) 202 to represent the association between the foreign key in table EMP and the corresponding unique key in the table DEPT. Cross-component reference 202 includes a primary reference in the form of an identifier (ID)=101 for the unique key of table DEPT. Cross-component reference 202 also includes a secondary reference in the form of a fully qualified pathname,

"TABLE\DEPT\UNIQUE_KEY\DEPT_ID", for the table DEPT. This secondary reference can be used in case an access through the primary reference for some reason fails as is described in more detail below with reference to FIG. 4.

Cross-Component Reference Structure

Figure 3A:
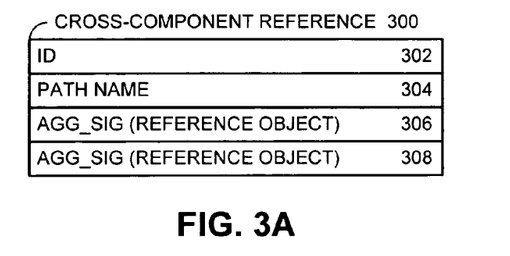
FIG. 3A illustrates the structure of a cross-component reference in accordance with an embodiment of the present invention.

FIG. 3A illustrates the structure of a cross-component reference (CCR) 300 in accordance with an embodiment of the present invention. Cross-component reference 300 includes a primary reference in the form of an ID 302 for the referenced object (component). This ID 302 is ideally unique and not reused. Cross-component reference 300 also includes a secondary reference in the form of a fully qualified pathname 304 for the referenced object. Note that if the referenced object resides outside of a local repository, the referenced object will not have an ID 302, but will only have a pathname 304.

In addition to ID 302 and pathname 304, cross-component reference 300 also includes an aggregate signature for the referenced object 306 and an aggregate signature for the referencing object 308. These aggregate signatures 306 and 308 are used to maintain consistency between the referencing object and the referenced object as is described in more detail below with reference to FIG. 6.

Figure 3B:
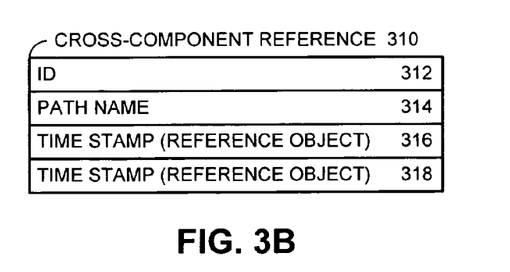
FIG. 3B illustrates the structure of another type of cross-component reference in accordance with an embodiment of the present invention.

FIG. 3B illustrates the structure of another type of cross-component reference (CCR) 310 in accordance with an embodiment of the present invention. Cross-component reference 310 is the same as cross-component reference 300 in FIG. 3A, except that it includes a time stamp 316 for the referenced object instead of an aggregate signature for the referenced object 306, and a time stamp 318 for the referencing object instead of an aggregate signature for the referenced object. These time stamps are similarly used to maintain consistency between the referenced object and the referencing object as is described in more detail below with reference to FIG. 6.

Process of Obtaining a Name for a Referenced Object

Figure 4:
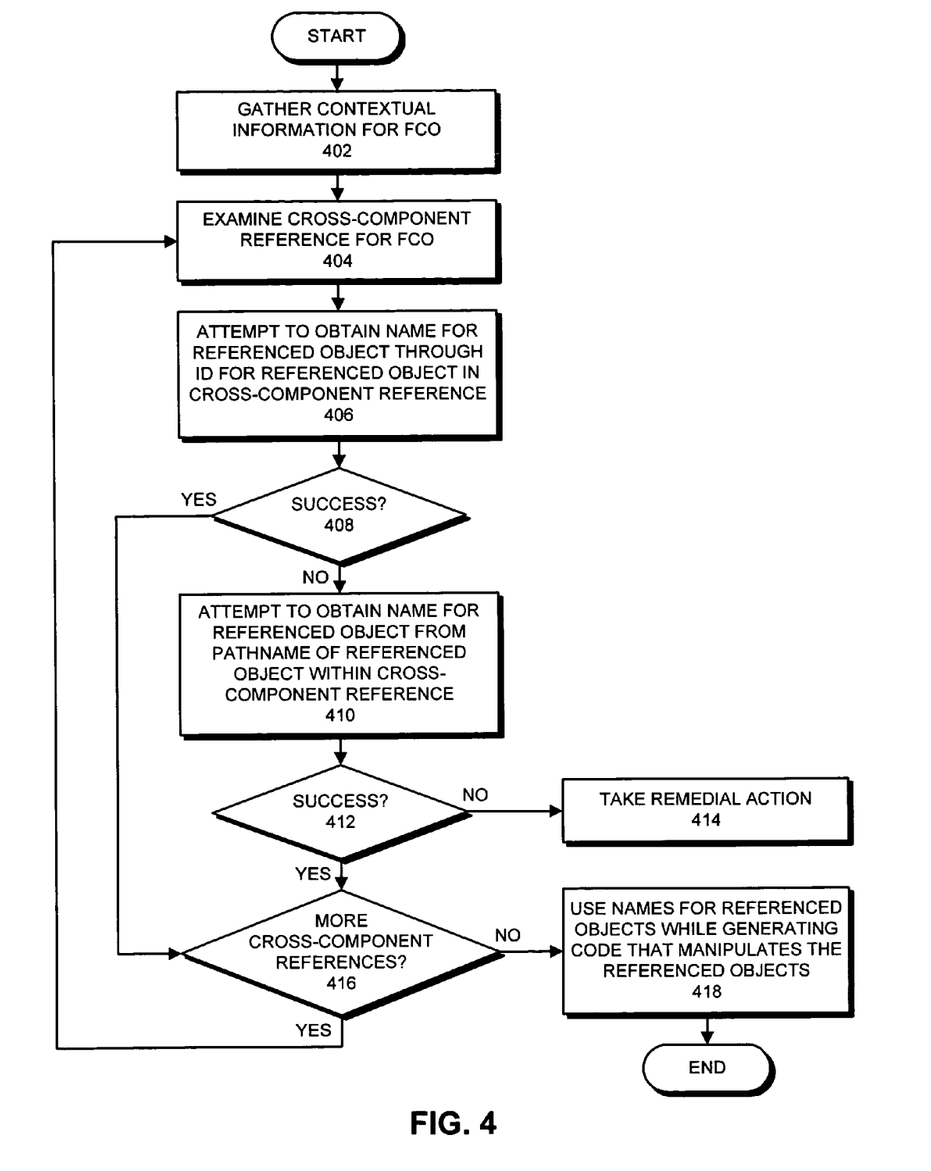
FIG. 4 presents a flow chart illustrating the process of obtaining a name for a referenced object in accordance with an embodiment of the present invention.

FIG. 4 presents a flow chart illustrating the process of obtaining a name for a referenced object in accordance with an embodiment of the present invention. The process starts when the system gathers contextual information for a first class object (FCO) (step 402).

Next, the system examines a cross-component reference (CCR) 300 from the FCO (step 404). The system then attempts to obtain a name for the referenced object through the ID for the referenced object 302 in cross-component reference 300 (step 406). The system then determines if the attempt was successful (step 408).

If the attempt was not successful, the system attempts to obtain the name for the referenced object from within the pathname for the referenced object 304 (step 410). This can involve reading the name of the referenced object from the pathname for the referenced object. The system then determines if the second attempt was successful (step 412). If not, the system takes a remedial action (step 414).

Otherwise, the second attempt was successful (or if the first attempt was successful in step 408), the system determines if there are any more cross-component references associated with the FCO (step 416). If so, the system returns to step 404 to obtain the name for the corresponding referenced object.

Otherwise, the system uses the names for referenced objects while generating code that manipulates the referenced objects (step 418).

Note that when code generation is invoked on a table, a foreign-key to unique-key reference is traversed to generate a constraint statement. If this reference is broken in a prior art system, no foreign-key constraint is generated; in fact, generation will not get invoked at all. With the secondary references provided by the present invention, the system can continue with generation in most cases, even when the primary reference is broken or non-existent.

Note that the above-described process for obtaining a name for an object (component) can also be used to during the process of displaying objects (components) within an UI for an editor, which allows objects to be manipulated.

Process of Importing an Object

Figure 5:
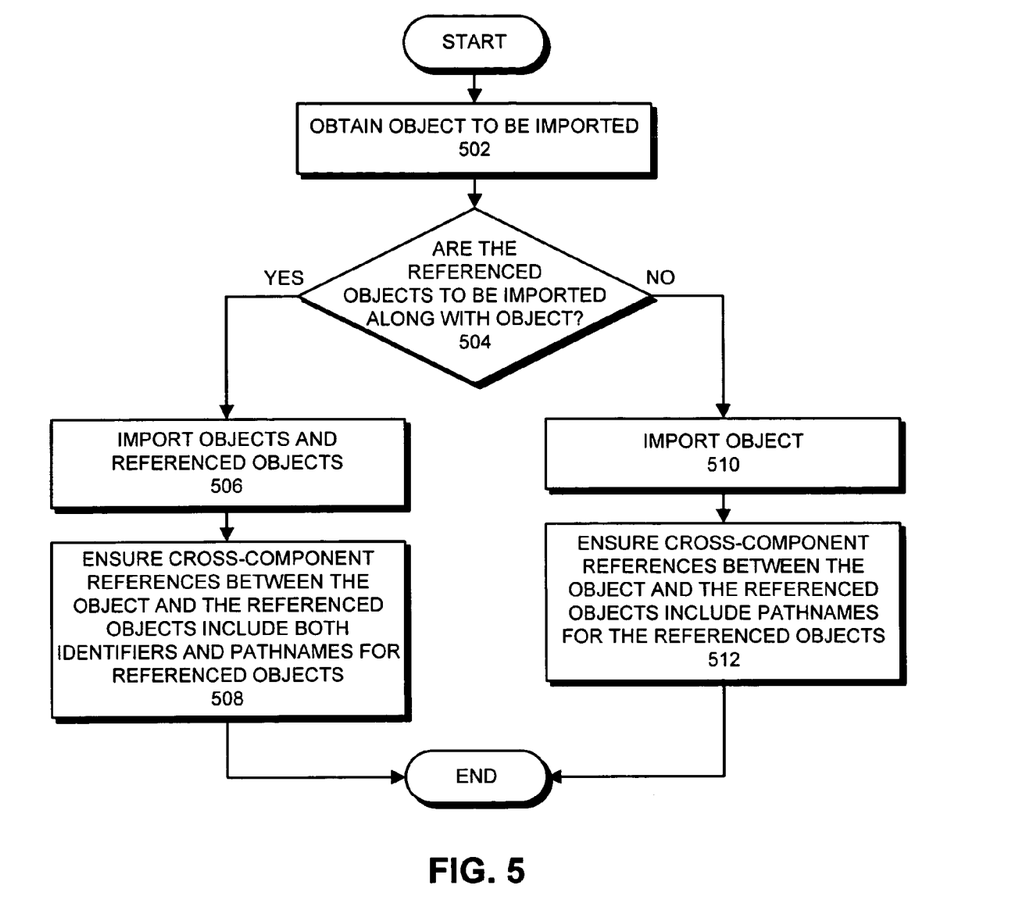
FIG. 5 presents a flow chart illustrating the process of importing an object into a repository in accordance with an embodiment of the present invention.

FIG. 5 presents a flow chart illustrating the process of importing an object into a repository in accordance with an embodiment of the present invention. Note that this process allows a dependent object to be imported without its referenced objects.

The system starts by obtaining an object (component) to be imported into repository 100 (step 502). Next, the system determines if referenced objects are to be imported along with the object (step 504). If so, the system imports the object along with the associated referenced objects in the repository 100 (step 506). In doing so, the system ensures that cross-component references between the object and the referenced objects include both identifiers (primary references) and pathnames (secondary references) for the referenced objects (step 508).

Otherwise, if referenced objects are not to be imported at step 504, the system imports only the object (step 510). In doing so, the system ensures that the cross-component references include pathnames for the referenced objects (step 512). Note that identifiers are generally not available for objects which do not reside within repository 100.

Process of Maintaining Consistency Between Objects

Note that a mapping component needs to maintain a copy of a referenced object in order to be able to generate independent of the referenced object. For example, a table T1, with a column C3 which is typed by TYP1 is not required to understand TYP1 in order to generate itself. Although metadata-wise this is true, from a user's perspective, when TYP1 is changed it does have an impact on T1 and the users of T1.

To support this need, the referencing object needs to be able to determine when a referenced object has changed since it was referenced. This implies that some additional metadata needs to be stored on the referencing object to keep track of consistency between the referenced object and the referencing object. To this end, one embodiment of the present invention maintains signatures of the referenced object and the referencing object within a cross-component reference to facilitate maintaining consistency between the referenced object and the referencing object.

Figure 6:
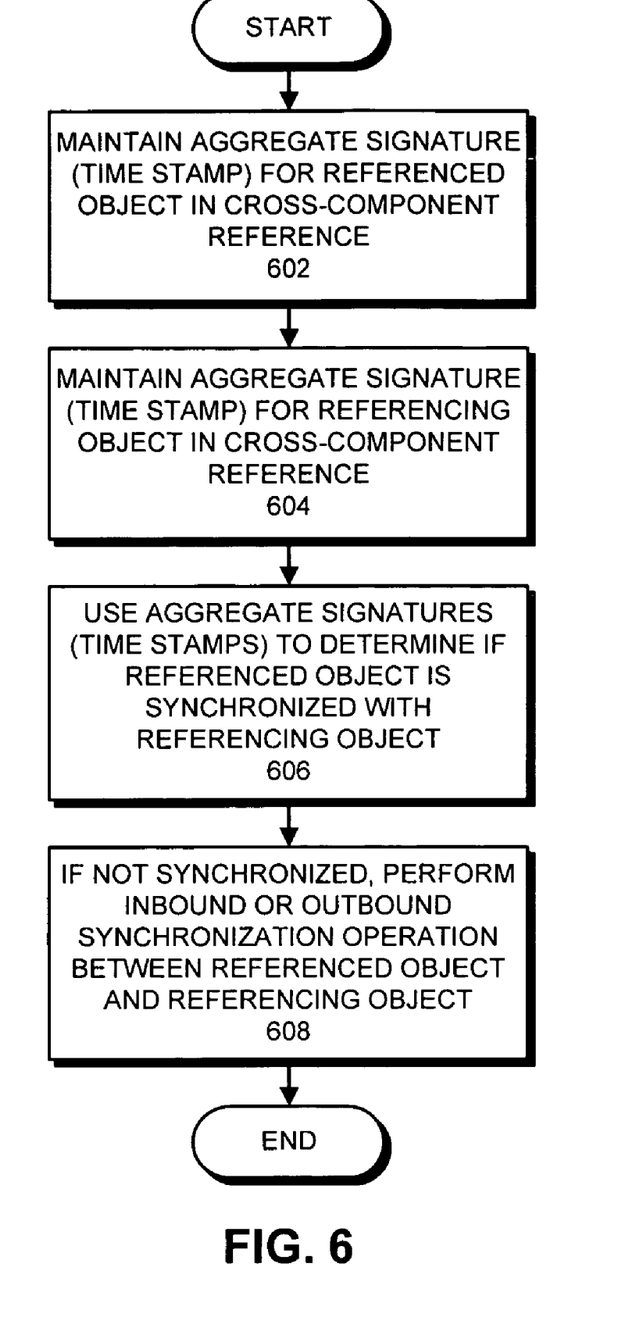
FIG. 6 presents a flow chart illustrating the process of maintaining consistency between a referencing object and a referenced object in accordance with an embodiment of the present invention.

FIG. 6 presents a flow chart illustrating the process of maintaining consistency between a referencing object and a referenced object in accordance with an embodiment of the present invention. During execution of a system that uses the objects, the system maintains an aggregate signature for the referenced object 306 within the cross-component reference 300 (step 602). This aggregate signature 306 specifies the structure of the referenced object.

Note that the aggregate signature can be computed based on the metadata signature of every child object using the following technique.

---

If the referenced object is not the aggregate parent,
    aggregate signature = metadata signature.
Otherwise,
    get all aggregated children recursively;
    sort the children;
    compute metadata signatures for each child in the sorted list; and
    concatenate the signatures.

---

Note that the system can alternatively maintain a time stamp for the referenced object, which can for example be obtained from the last inbound synchronization operation from the referenced object. The system similarly maintains an aggregate signature 308 (or time stamp) for the referencing object within the cross-component reference 300 (step 604).

Next, the system uses the aggregate signatures (or time stamps) 306 and 308 to determine if the referenced object is synchronized with the referencing object (step 606). For example, the system can compare the aggregate signature of the referenced object 306 (from within the cross-component reference) against the current structure (or current aggregate signature) of the referenced object. If these differ, the referenced object may not be synchronized with the referenced object. The system can also can compare the aggregate signature of the referencing object 308 against the current structure (or current aggregate signature) of the referencing object to determine if they differ.

If the referenced object is not synchronized with the referencing object, the system performs with an inbound or outbound synchronization operation between the referenced object and the referencing object (step 608).

EXAMPLE

In some situations, a component or a subcomponent is derived from another component or a subcomponent, or copy of a component/subcomponent is maintained in other component/subcomponent. The derived component (or copy acts) as the referencing object and the derivation/original acts as the referenced object and the inter-component association between the copy and the original represents a binding.

In this case, one embodiment of the present invention provides a synchronization mechanism, which synchronizes the copy from the master (inbound synchronization) and vice-versa (outbound synchronization). Note that the copy and the original are not aware of changes to each other and reconciliation needs to be invoked to ensure that they are synchronized, irrespective of whether it is required or not.

Figure 7:
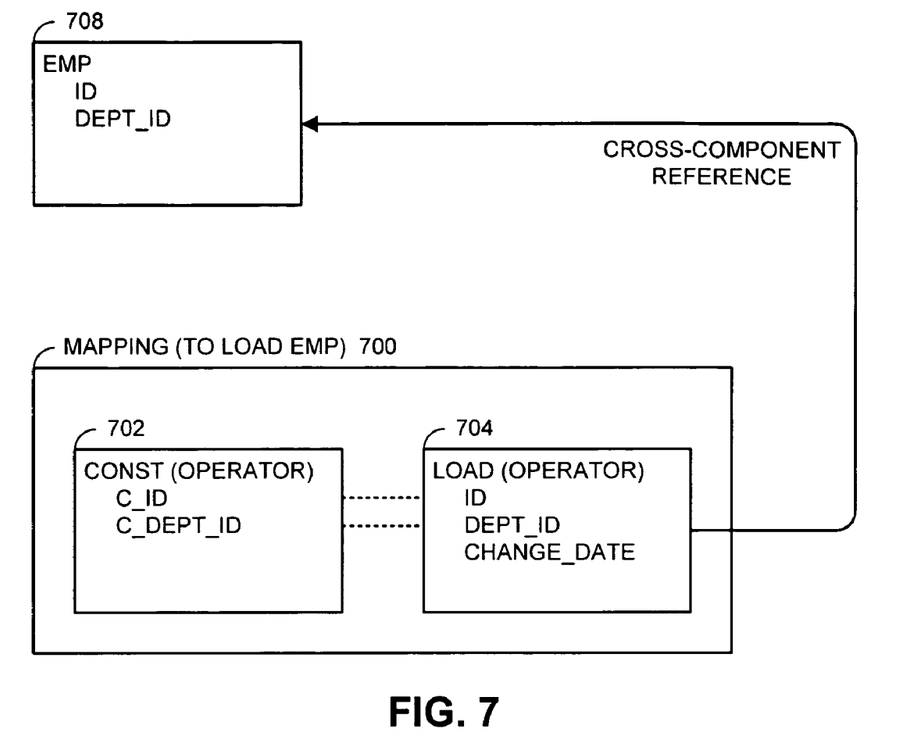
FIG. 7 presents an example which involves a cross-component reference between a mapping and a table in accordance with an embodiment of the present invention.

For example, FIG. 7 presents an example which involves a cross-component reference between a mapping and a table in accordance with an embodiment of the present invention. In this example, the component is a mapping 700 that loads the table EMP 708. This mapping 700 includes a number of operators, including a CONST operator 702 which holds constant values to be loaded and an EMP operator 704, which essentially stores a copy of the table EMP 708.

In this example, a change to the table EMP resets its aggregate signature, which is then out-of-synch with the aggregate signature for EMP contained in the cross-component reference. In this case, an inbound synchronization is required to make the EMP operator within mapping 700 consistent with the EMP table 708. (This inbound synchronization can be automatically performed by the system, or alternatively, the user can be given the responsibility of initiation the inbound synchronization.)

Similarly, a change to the EMP operator with mapping 700 (such as adding the CHANGE_DATE column) resets its aggregate signature, which is then out-of-synch with the aggregate signature for the referencing object contained in the cross-component reference. In this case, an outbound synchronization is required to make the EMP table consistent with the EMP operator within mapping 700.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for supporting cross-component references in an object-oriented programming system, comprising:
   making a first attempt to obtain a name for a referenced object through a cross-component reference between a referencing object and the referenced object, wherein the first attempt involves attempting to access the referenced object through an identifier for the referenced object within the cross-component reference, and wherein the identifier for the referenced object is obtained from a component which comprises the cross-component reference;
   if the first attempt fails, making a second attempt to obtain the name for the referenced object, which involves obtaining a pathname for the referenced object from the cross-component reference,
   wherein the referencing object and the referenced object are database objects, and wherein the component is a collection of database objects;
   maintaining a first time stamp, within the cross-component reference, indicating the time of the last inbound synchronization from the referenced object to the referencing object;
   maintaining a second time stamp, within the cross-component reference, indicating the time of the last outbound synchronization from the referencing object to the referenced object;
   using the first time stamp and the second time stamp to determine whether or not the referenced object is synchronized with the referencing object; and
   importing an object into a repository, wherein importing the object comprises:
      determining if the referenced object is to be imported along with the object;
      if so, ensuring that the cross-component reference between the object and the referenced object includes both the identifier for the referenced object and the pathname for the referenced object;
      otherwise, ensuring that cross-component references between the object and the referenced object includes the pathname for the referenced object.

2. The method of claim 1, wherein the second attempt also involves obtaining the name for the referenced object from the pathname for the referenced object.

3. The method of claim 1, wherein the method further comprises:
   maintaining a first aggregate signature, which reflects the structure of the referenced object, within the cross-component reference;
   maintaining a second aggregate signature, which reflects the structure of the referencing object, within the cross-component reference; and
   using the first aggregate signature and the second aggregate signature to determine whether or not the referenced object is synchronized with the referencing object.

4. The method of claim 1, wherein if the referenced object is not synchronized with the referencing object, the method further comprises performing an inbound or outbound synchronization operation between the referenced object and the referencing object.

5. The method of claim 1, wherein the method further comprises using the name for the referenced object while generating code that manipulates the referenced object.

6. The method of claim 1, wherein the method further comprises using the cross-component reference to access the referenced object from the referencing object.

7. A computer-readable storage medium storing instructions that when executed by a computer cause the computer to perform a method for supporting cross-component references in an object-oriented programming system, the method comprising:
   making a first attempt to obtain a name for a referenced object through a cross-component reference between a referencing object and the referenced object, wherein the first attempt involves attempting to access the referenced object through an identifier for the referenced object within the cross-component reference, and wherein the identifier for the referenced object is obtained from a component which comprises the cross-component reference;
   if the first attempt fails, making a second attempt to obtain the name for the referenced object, which involves obtaining a path name for the referenced object from the cross-component reference,
   wherein the referencing object and the referenced object are database objects, and wherein the component is a collection of database objects;

maintaining a first time stamp, within the cross-component reference, indicating the time of the last inbound synchronization from the referenced object to the referencing object;

maintaining a second time stamp, within the cross-component reference, indicating the time of the last outbound synchronization from the referencing object to the referenced object;

using the first time stamp and the second time stamp to determine whether or not the referenced object is synchronized with the referencing object; and importing an object into a repository, wherein importing the object comprises:

determining if the referenced object is to be imported along with the object;

if so, ensuring that the cross-component reference between the object and the referenced object includes both the identifier for the referenced object and the pathname for the referenced object;

otherwise, ensuring that cross-component references between the object and the referenced object includes the path name for the referenced object.

8. The computer-readable storage medium of claim 7, wherein the second attempt also involves obtaining the name for the referenced object from the pathname for the referenced object.

9. The computer-readable storage medium of claim 7, wherein the method further comprises:

maintaining a first aggregate signature, which reflects the structure of the referenced object, within the cross-component reference;

maintaining a second aggregate signature, which reflects the structure of the referencing object, within the cross-component reference; and using the first aggregate signature and the second aggregate signature to determine whether or not the referenced object is synchronized with the referencing object.

10. The computer-readable storage medium of claim 7, wherein if the referenced object is not synchronized with the referencing object, the method further comprises performing an inbound or outbound synchronization operation between the referenced object and the referencing object.

11. The computer-readable storage medium of claim 7, wherein the method further comprises using the name for the referenced object while generating code that manipulates the referenced object.

12. The computer-readable storage medium of claim 7, wherein the method further comprises using the cross-component reference to access the referenced object from the referencing object.

13. An apparatus that supports cross-component references in an object-oriented programming system, comprising:

a name-obtaining mechanism, a synchronization-checking mechanism, and an import mechanism, stored in a memory and executed by a processor;

wherein the name-obtaining mechanism is configured to:

make a first attempt to obtain a name for a referenced object through a cross-component reference between a referencing object and the referenced object, wherein the first attempt involves attempting to access the referenced object through an identifier for the referenced object within the cross-component reference, and wherein the identifier for the referenced object is obtained from a component which comprises the cross-component reference;

if the first attempt fails, make a second attempt to obtain the name for the referenced object, which involves obtaining a pathname for the referenced object from the cross-component reference, wherein the referencing object and the referenced object are database objects, and wherein the component is a collection of database objects;

wherein the synchronization-checking mechanism is configured to:

maintain a first time stamp, within the cross-component reference, indicating the time of the last inbound synchronization from the referenced object to the referencing object;

maintain a second time stamp, within the cross-component reference, indicating the time of the last outbound synchronization from the referencing object to the referenced object;

use the first time stamp and the second time stamp to determine whether or not the referenced object is synchronized with the referencing object; and wherein the import mechanism is configured to:

determine if the referenced object is to be imported along with the object;

if so, ensure that the cross-component reference between the object and the referenced object includes both the identifier for the referenced object and the pathname for the referenced object;

otherwise, ensure that cross-component references between the object and the referenced object includes the path name for the referenced object.

14. The apparatus of claim 13, wherein during the second attempt, the name-obtaining mechanism is also configured to obtain the name for the referenced object from the pathname for the referenced object.

15. The apparatus of claim 13, wherein the apparatus further comprises a synchronization-checking mechanism which is configured to:

maintain a first aggregate signature, which reflects the structure of the referenced object, within the cross-component reference;

maintain a second aggregate signature, which reflects the structure of the referencing object, within the cross-component reference; and to use the first aggregate signature and the second aggregate signature to determine whether or not the referenced object is synchronized with the referencing object.

16. The apparatus of claim 13, further comprising a synchronization mechanism, wherein if the referenced object is not synchronized with the referencing object, the synchronization mechanism is configured to perform an inbound or outbound synchronization operation between the referenced object and the referencing object.

17. The apparatus of claim 13, wherein the apparatus further comprises a code generation mechanism configured to use the name for the referenced object while generating code that manipulates the referenced object.

18. The apparatus of claim 13, further comprising an accessing mechanism, which is configured to use the cross-component reference to access the referenced object from the referencing object.

* * * * *

UNITED STATES PATENT AND TRADEMARK OFFICE
CERTIFICATE OF CORRECTION

PATENT NO. : 7,401,340 B2  Page 1 of 1
APPLICATION NO. : 10/970454
DATED : July 15, 2008
INVENTOR(S) : Leigh It is certified that error appears in the above-identified patent and that said Letters Patent is hereby corrected as shown below:

Title Page, Item (56) On page 2, in column 1, under "Other Publications", line 3, delete "Prceedings" and insert -- Proceedings --, therefor.

Title Page, Item (56) On page 2, in column 1, under "Other Publications", line 3, delete "Internation" and insert -- International --, therefor.

Title Page, Item (56) On page 2, in column 1, under "Other Publications", line 5, delete "Ronbert" and insert -- Robert --, therefor.

Title Page, Item (56) On page 2, in column 1, under "Other Publications", line 6, delete "Presense" and insert -- Presence --, therefor.

Title Page, Item (56) On page 2, in column 2, under "Other Publications", line 5, delete "Inernational" and insert -- International --, therefor.

In column 3, line 31, delete "DYDs" and insert -- DVDs --, therefor.

Signed and Sealed this

Twenty-second Day of December, 2009

David J. Kappos
*Director of the United States Patent and Trademark Office*